(12) United States Patent
Lin et al.

(10) Patent No.: US 6,747,697 B1
(45) Date of Patent: Jun. 8, 2004

(54) METHOD AND APPARATUS FOR DIGITAL IMAGE DEFECT CORRECTION AND NOISE FILTERING

(75) Inventors: Zhongmin Steve Lin, Solon, OH (US); David Nicolay, Fairview Park, OH (US); Hung Yuet Wong, Solon, OH (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 782 days.

(21) Appl. No.: 09/614,336

(22) Filed: Jul. 12, 2000

(51) Int. Cl.[7] .............................. H04N 9/64; G06K 9/40
(52) U.S. Cl. ...................... 348/246; 348/241; 348/247; 348/607; 348/610; 348/616; 348/619; 250/559.04; 250/559.05; 250/559.06; 250/559.07; 250/559.08; 250/559.4; 250/559.45; 250/559.46; 378/98.8; 382/260; 382/261; 382/262; 382/270; 382/272; 382/274; 382/275
(58) Field of Search .................................. 348/241, 246, 348/247, 607, 610, 616, 619, 622; 250/370.08, 370.14, 559.04, 559.05, 559.06, 559.07, 559.08, 559.4, 559.45, 559.46; 378/98.8; 382/260, 261, 262, 270, 272, 274, 275

(56) References Cited

U.S. PATENT DOCUMENTS

| | | | |
|---|---|---|---|
| 4,454,541 A | 6/1984 | Duschl | ........................ 358/106 |
| 4,639,775 A | 1/1987 | Cohen et al. | ................. 358/106 |
| 4,734,774 A | 3/1988 | Skaggs et al. | .......... 358/213.15 |
| 5,327,240 A | * 7/1994 | Golston et al. | .............. 348/607 |
| 5,327,246 A | 7/1994 | Suzuki | ........................ 348/246 |
| 5,617,461 A | 4/1997 | Schreiner | |
| 5,917,589 A | * 6/1999 | Imaino et al. | ............ 356/237.2 |
| 6,035,072 A | 3/2000 | Read | |
| 6,137,917 A | * 10/2000 | Park | ............................ 382/262 |

OTHER PUBLICATIONS

Kasparis, et al., "Detail–Preserving Adaptive Conditional Median Filters", Journal of Electronic Imaging, SPIE_+ IS&T, US V. 1, No. 4, Oct. 1, 1992 358–364.

* cited by examiner

Primary Examiner—Andrew Christensen
Assistant Examiner—Brian Genco
(74) Attorney, Agent, or Firm—Fay, Sharpe, Fagan, Minnich & McKee, LLP

(57) ABSTRACT

An adaptive median filter (40) provides dynamic detection and correction of digital image defects which are caused by defective or malfunctioning elements of a radiation detector array (20). The adaptive median filter receives (100) lines of pixel values of a digital image that may have defects and a user-defined defect threshold. The lines of pixel values are scanned on a pixel-by-pixel basis using a kernel of n×n pixels, where the kernel contains the candidate pixel being examined (120). Each kernel is numerically reordered (130) and a median value is calculated (140). A defect threshold value is calculated by multiplying the user-defined defect threshold criteria and the candidate pixel value (150). A reference value is calculated by subtracting the candidate pixel value and the median value (160). The reference value is compared to the defect threshold value (170). The candidate pixel value is replaced by the median value (180) if it differs from the median value by more than the predefined defect threshold, e.g., 20%. The adaptive median filter is particularly effective in detecting and correcting double line and double column defects in digital images. In addition, the filter minimizes image blurring and maintains image resolution by filtering only defective pixels.

18 Claims, 2 Drawing Sheets

METHOD AND APPARATUS FOR DIGITAL IMAGE DEFECT CORRECTION AND NOISE FILTERING

BACKGROUND OF THE INVENTION

The present invention relates to the art of digital image defect correction. It finds particular application in conjunction with diagnostic imaging in fluorographic and fluoroscopic systems having flat panel radiation detectors and will be described with particular reference thereto. It is to be appreciated, however, that the invention will also find application in conjunction with CCD imagers, solid state image pickup devices, conventional x-ray diagnostic systems, computerized tomographic scanners, and other radiation detection systems for medical and non-medical examinations.

Typically, fluoroscopy includes a plurality of image intensifiers or two-dimensional, flat panel radiation detectors which convert X-ray radiation traversing a patient examination area into electronic signals. Each radiation detector includes a radiation sensitive face, such as a scintillation crystal, which converts the received radiation into a corresponding quantity of light. Solid state diodes are often provided to convert the light emitted by the scintillation crystal into analog electrical signals indicative of the intensity of the crystal emitted light, hence the intensity of the received radiation. The analog signals are converted into corresponding digital signals which are reconstructed into digital images.

Unfortunately, many flat panel radiation detectors, especially large-area flat panel detectors, contain single pixel defects, line defects, double-line defects, and column defects which lead to the generation of defective digital image representations. Prior art techniques correct such pixel, line, and column defects with a series of processes, typically consisting of defect map correction and median filtering. In defect map correction techniques, a base defect map of each panel detector is created during the manufacture of the flat panel detector. Additional defect maps may be created during subsequent calibrations of the panel detectors. These defect maps are used for the first order detection of permanent defects in the panels and interpolations, such as a median filter, are used to correct these permanent defects. A median filter algorithm is also applied to the entire image in order to provide secondary defect correction for random defects that do not have fixed patterns. This multi-phase defect correction process suffers from processing complexity and inefficiency.

Conventional median filter algorithms adjust all of the pixels of an image representation. In other words, each pixel of an image is replaced by the median value of the pixels in the neighborhood of the particular pixel being examined. This type of median filtering blurs images, which results in great reduction in image resolution. Further, conventional median filters cannot correct double line and double column defects. In fact, conventional median filters can introduce additional image defects by incorrectly replacing pixels adjacent to defective lines and columns with median values of neighborhood pixels.

The present invention contemplates a new and improved method for detecting and correcting digital image defects which overcomes the above-referenced problems and others.

SUMMARY OF THE INVENTION

In accordance with one aspect of the present invention, a method for real-time detection and correction of digital image defects due to defective detector pixels includes copying inputted image data which includes pixel values corresponding to each of a plurality of pixels of an image into a correction memory. For each pixel of the inputted image data, a kernel of n×n pixels is selected. The kernel contains a candidate pixel to be examined where the candidate pixel has an unprocessed pixel value. A median pixel value is calculated for the kernel. In addition, a threshold value based on the unprocessed pixel value of the candidate pixel and a predefined defect threshold is calculated. A difference value between the median pixel value and the unprocessed pixel value is calculated. The difference value is compared to the threshold value. In accordance with the comparing, either the candidate pixel value is replaced with the median pixel value or the candidate pixel value is retained.

In accordance with another aspect of the present invention, a method for detecting and correcting detector aberration defects in digital diagnostic images includes non-invasively examining a patient and generating diagnostic image data. The diagnostic image data is organized into a two or three-dimensional array of image pixel values. Each of a plurality of the pixel values is compared with a threshold criteria. In response to the compared pixel value passing the threshold criteria, the compared pixel value is retained. In response to the compared pixel value failing the threshold criteria, the pixel value is replaced with a value calculated from neighboring pixel values. The retained and replaced pixel values then form a corrected digital diagnostic image.

In accordance with another aspect of the present invention, a radiographic apparatus includes a penetrating radiation source which projects x-rays across an examination region. A plurality of radiation detector arrays are disposed across the x-ray examination region from the penetrating source. The detector arrays include analog-to-digital converters which convert analog signals into digital image signals. An image calibration processor performs image offset and gain calibration on the digital image signals. An adaptive median filter detects and corrects defects in the digital image signals due to defective detectors in the radiation detector arrays. The adaptive median filter includes a memory which stores each candidate pixel value and neighboring pixel values. A processor calculates a reference value from the neighboring pixel values. Further, the processor compares a relationship between the candidate pixel value and the reference value with a threshold criterion. Based on the comparison, the processor either replaces the candidate pixel value with a function of the neighboring pixel values or retains the candidate pixel value.

In accordance with another aspect of the present invention, a method of radiographic diagnostic examination includes propagating x-rays through a subject. With a two-dimensional radiation detector panel, the x-rays which have propagated through the subject are detected. The detected x-rays are converted into light signals and the light signals are converted into electrical signals. The electrical signals are then read out into an image representation. The image representation is scanned over on a pixel-by-pixel basis using an n×n kernel. A median value of each kernel is calculated for each scanned pixel. A deviation between the median value and a pixel value of the scanned pixel is calculated. The deviation is compared to a defect threshold. Based on the comparison, either the pixel value of the scanned pixel is replaced with the median value or the pixel value of the scanned pixel is retained. At least a portion of the corrected image representation is then converted into a human-readable display.

In accordance with another aspect of the present invention, an adaptive filter for detecting and correcting digital image defects includes a memory which stores each candidate pixel value and each kernel containing each candidate pixel value and a plurality of neighboring pixel values. A processor reorders each kernel in order to calculate a median value for the kernel. The processor calculates a difference between the candidate pixel value and the median value. The processor then compares the difference to a defect threshold and based on the comparison, the processor either replaces the candidate pixel value with the median value or retains the candidate pixel value.

One advantage of the present invention is that it simplifies the detection and correction of defects in images acquired using flat panel radiation detectors.

Another advantage of the present invention is that it corrects image data dynamically on the fly without a priori mapping or calibration.

Another advantage of the present invention is that it corrects image defects without reducing overall image resolution.

Another advantage of the present invention is that it corrects double line and double column defects.

Another advantage of the present invention is that it corrects image defects without creating additional defects.

Yet another advantage of the present invention resides in its combining image defect detection and correction into a single procedure.

Still another advantage of the present invention is that it leaves most image data unaltered.

Other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
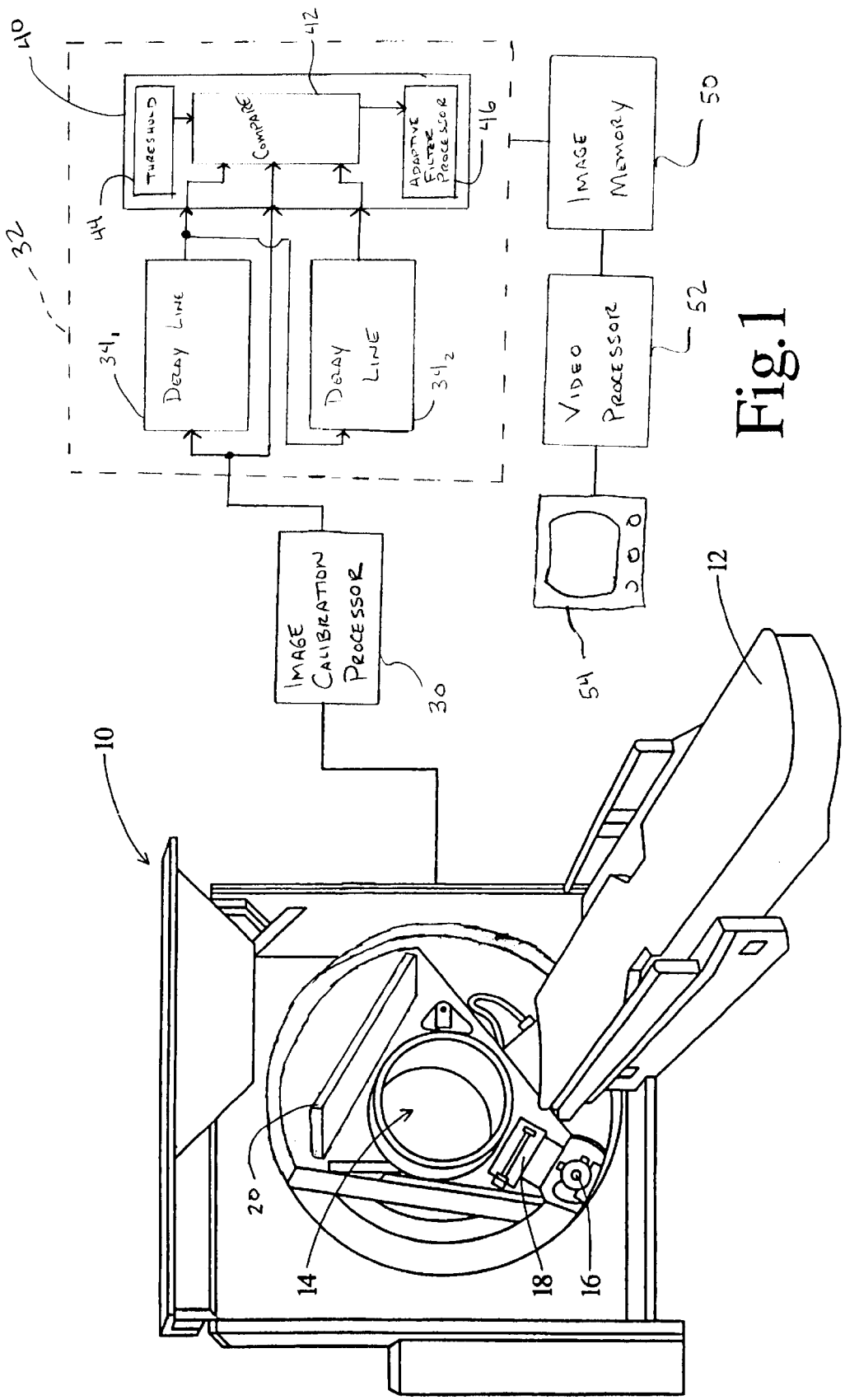
FIG. 1 is a diagrammatic illustration of a Fluoro Assistant CT system (FACTs) attached to a CT scanner employing the adaptive median filter in accordance with the present invention; and, FIG. 2 is a flow chart illustrating details of the defect detection and correction procedure in accordance with the present invention.

With reference to FIG. 1, a fluoroscopic system 10 radiographically examines and generates diagnostic images of a subject disposed on a patient support 12. More specifically, a volume of interest of the subject on the support 12 is moved into an examination region 14. An x-ray tube 16 mounted on a rotating gantry projects a beam of radiation through the examination region 14. A collimator 18 collimates the beam of radiation in one dimension.

The two-dimensional x-ray detectors 20 includes a two-dimensional array of photodetectors connected or preferably integrated into an integrated circuit. A scintillator, comprising a thallium-doped CsI layer, is deposited directly on the photodetector array. X-rays that have traversed the examination region 14 are received through the front face of the scintillation crystal. The scintillation crystal converts these x-rays into a flash or scintillation of visible light of a characteristic wavelength. The visible light exits the scintillation layer via a surface that is optically coupled to the photodetectors. Light from the scintillation layer is converted by the photodetector into corresponding electrical signals indicative of the intensity of the received radiation which is indicative of the integrated x-ray absorption along the corresponding ray between the x-ray rube and the scintillation layer segment.

The electrical signals, along with information on the angular position of the rotating gantry, are digitized by analog-to-digital converters. The digital diagnostic data is processed for offset and gain calibration by an image calibration processor 30. The digital image representation includes a rectangular array of digital pixel values, each indicating the gray scale of a corresponding image pixel. For simplicity of illustration, a two-dimensional array corresponding to a projection image is described in detail. However, it is to be appreciated that the present technique is also applicable to three-dimensional arrays representing a volume.

When the projection image representation is generated, lines of pixel values are passed through an adaptive filter 32, preferably a median filter. The adaptive median filter 32 performs a real-time detection and correction of image defects. Such image defects may be due to pixel defects, line defects, double-line defects, column defects, and double-column defects in the two-dimensional detector panel 20, as well as random defects. For an n×n adaptive filter, read out lines of pixel values are temporarily stored in n-1 digital line memory devices $34_1$, $34_2$, . . . . In the illustrated 3×3 embodiment, the buffer stores the two preceding lines. A field programmable gate array (FPGA) 40 reads the current and two preceding data lines. As the oldest data line is read out of one buffer, the current data line is read into it.

The FPGA 40 includes a comparitor circuit or processor 42 which compares the pixel values of the three lines with threshold criteria 44. Various threshold criteria are contemplated. Preferably, each pixel value of the middle line is compared with the eight immediately surrounding pixel values in itself and in the two adjoining data lines. If a pixel value varies by 20% or another preselected percentage from the median value of its eight nearest neighbors, an adaptive filter processor 46 replaces it with the median value of its nearest neighbors. Rather than (or in addition to) the 20% threshold criteria, each pixel value can be compared with other criteria including full black and full white. The adaptive filter replaces each pixel value that fails these criteria with a median or other preselected function of its nearest neighbors that are not full black or white. Pixel values which pass the test are not altered by the adaptive filter. In this manner, any (if any) pixel values of the middle data line that failed the test are replaced with median filtered values and are passed by the adaptive filter for further processing. After the middle data line is scanned with the n×n kernel, the lines of data are indexed with a new line added and the most remote line dropped.

The implementation of the adaptive median filter in a pipelined architecture yields one processed pixel output for every unprocessed input pixel, often referred to as a systolic processor. The outputs are delayed with respect to the input by the pipeline processing delay time. More specifically, after n×n pixels are latched by the FPGA, a sorting algorithm within the FPGA yields the median value of the n×n kernel. In parallel, the unprocessed value of the given pixel is stored and made available along with the median value.

Also in parallel, a multiplier within the FPGA computes a threshold value for the pixel being examined by multiplying the unprocessed or original pixel value by the predefined defect threshold, 0.2 for example. The difference between the original unprocessed pixel value and the median value is determined by a sort and subtraction algorithm within the FPGA and then compared to the threshold value. If the difference value is greater than the threshold value, the median value is substituted for the original pixel value at the output of the FPGA. Otherwise, the original pixel value is at the output of the FPGA. Artisans will appreciate that all data, including original pixel, median value, threshold value, and difference value, are synchronized through pipelined latches. Further, the horizontal and vertical raster synchronization signal timing relationship with respect to a given pixel is also maintained using shift registers.

The filtered image is stored in a volumetric image memory 50. A video processor 52 processes the defect-corrected image to create projection images, and reformats them for display on a monitor 54, such as a video or LCD monitor.

Figure 2:
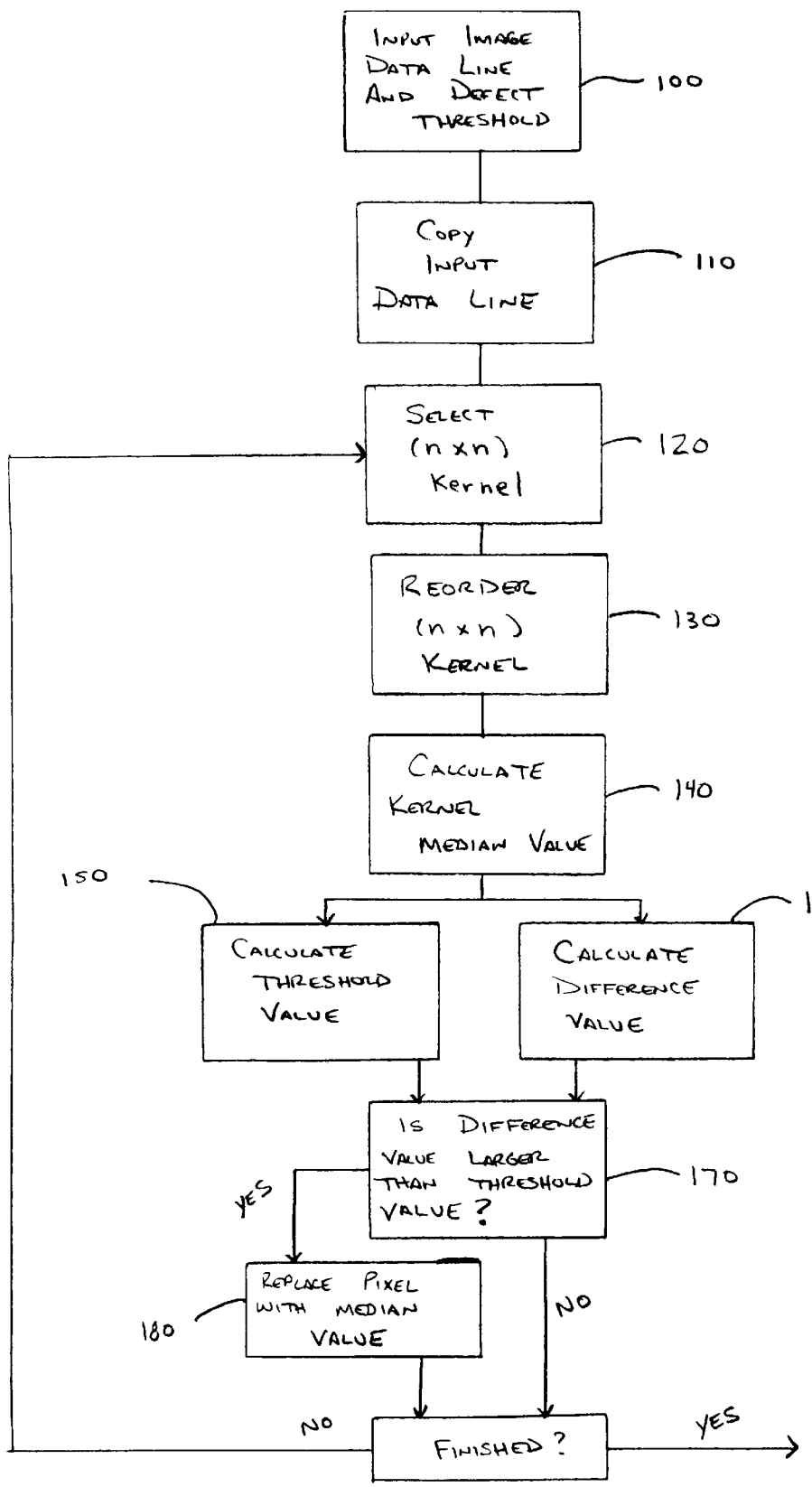

With reference to FIG. 2 and continuing reference to FIG. 1, a more detailed method and software based apparatus for detecting and correcting digital image defects begins at step 100 with the inputting of lines of digital pixel values and a predefined defect threshold into the adaptive median filter. Again, the predefined defect threshold is used by the adaptive median filter to determine whether a given pixel of the image should be replaced by the median value of the neighboring pixels or should be left unaltered. The inputted line of pixel values is then copied 110 into a correction memory for processing. A kernel of n×n pixels is selected 120, with the central pixel value of the kernel being the candidate pixel value to be examined. In one embodiment, a 3×3 kernel is selected with the center pixel of the kernel being examined and compared to the eight adjacent nearest neighbor pixels.

The selected n×n kernel is reordered 130. More particularly, the pixel values of the selected n×n kernel are sorted numerically by value and adjacent pixels of like value are merged into a single pixel value. A median value of the reordered and condensed kernel is calculated 140. For example, in a 3×3 kernel of nine pixels, the pixel value that is being processed is compared to the median value of the nine pixels in the kernel. However, before the median value of the kernel is calculated, any pixel values in the kernel of like value are combined or condensed into a single representation of the common value. For example, three adjacent pixels may each have a value of "1". These three pixels are then merged into a single merged pixel having a value of "1". Then, a median value of the six pixel values reordered kernel is calculated. The median is advantageous for its computational simplicity, speed and ability to correct double line and double column defects. However, other functions of the surrounding pixel values based on spread, slope, weighted averages, more complex and other functions are also contemplated.

A threshold value for the particular pixel being examined is calculated 150. The threshold value is calculated, in the preferred embodiment, by multiplying the candidate pixel value by the predetermined defect threshold criteria. In addition, a reference value is calculated 160 by subtracting the median value of the selected kernel from the candidate pixel value. The calculated difference value 160 is then compared 170 to the calculated threshold value 150. If the difference value is greater than the threshold value, the original pixel value is replaced 180 by the median value of the kernel in which the candidate pixel is located 180. If the difference value is less than the threshold value, the candidate pixel is determined to be free of defect and the original candidate pixel value remains unchanged.

In one embodiment, the defect threshold is selected to be 20%. In other words, candidate pixel values which differ by greater than 20% from the median value of the kernel in which they are located are replaced by the median value of the kernel. Conversely, candidate pixel values that are within 20% of the median value of the kernel in which they are located remain at their original unprocessed pixel value. In an alternate embodiment, the defect threshold may be chosen such that the adaptive median filter searches only for pixels having a zero value, i.e. dark, or a maximum value, i.e. white. It is to be appreciated that the following filtering procedure is performed on all of the pixel values for real-time detection and correction of image defects.

It is to be appreciated that the adaptive median filter is effective in correcting pixel defects, line and column defects, including double line and double column defects, bipolar line and column defects, such as one line white and adjacent line black, cluster pixel defects, ASIC boundary lines, driver line noises, noisy pixels, and the like.

Although median filters are particularly effective, it is contemplated that other filters and interpolation techniques can be utilized. For example, the pixel being examined and any zero level pixels and saturated pixels can be excluded from the kernel median. Pixel values in the kernel can be preferentially weighted. Other kernels, such as larger kernels, non-square kernels, and the like are also contemplated. Higher order interpolations may also be utilized.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method for real-time detection and correction of digital image defects due to defective detector pixels, the method including:

(a) copying inputted image data which includes pixel values corresponding to each of a plurality of pixels of an image into a correction memory;

(b) for each pixel of the inputted image data, selecting a kernel of n×n pixels, the kernel containing a candidate pixel to be examined, said candidate pixel having an unprocessed pixel value;

(c) calculating a median pixel value for the kernel;

(d) calculating a threshold value based on the unprocessed pixel value of the candidate pixel and a predefined defect threshold;

(e) calculating a difference value between the median pixel value and the unprocessed pixel value;

(f) comparing the difference value to the threshold value; and, (g) in accordance with the comparing, one of (1) replacing the candidate pixel value with the median pixel value and (2) retaining the candidate pixel value.

2. The method according to claim 1, wherein step (c) includes:

sorting the pixel values of the selected kernel according to numeric value; and, merging like pixel values into a single value prior to calculating the median pixel value.

3. The method according to claim 1, wherein in step (g):

the unprocessed pixel value is replaced by the median pixel value for pixel locations in which the difference value is greater than the threshold value; and the unprocessed pixel value is retained where the threshold value is greater than the difference value.

4. The method according to claim 1, wherein n=3 and the defect threshold is 20%.

5. The method according to claim 1, wherein:

steps (b) through (g) are repeated for each pixel within the digital image.

6. A method for detecting and correcting detector aberration defects in digital diagnostic images, the method comprising:

generating diagnostic image data;

organizing the diagnostic image data into a two or three-dimensional array of image pixel values;

merging adjacent pixels of like value into a single pixel value to generate grouped pixel values;

selecting an n×n kernel of pixels to be examined, where n is an integer greater than 2;

calculating a median pixel value of the grouped pixel values;

comparing pixel values of the kernel with threshold criteria;

(1) in response to the compared pixel value passing the threshold criteria, retaining the compared pixel value, (2) in response to the compared pixel value failing the threshold criteria, replacing the pixel value with the median pixel value;

whereby, the retained and replaced pixel values form a corrected digital diagnostic image.

7. A method for detecting and correcting defects in digital diagnostic images comprising:

generating diagnostic image data;

organizing the diagnostic image data into a two or three-dimensional array of pixels;

selecting an n×n kernel of pixels to be examined, where n is an integer greater than 2;

merging adjacent pixels of like value into a single pixel value to generate grouped intensity values;

calculating a median value of the grouped intensity values;

in response to generating a group of three or more intensity values;

comparing the center pixel value to the median value, determining whether the center pixel value deviates by more than a preselected percentage from the median value, and, based on a comparison, one of retaining the center pixel value and replacing the center pixel value with a value calculated from neighboring pixel values; and in response to generating a group of two intensity values;

determining whether a first intensity value is one of at or below a preselected intensity value for black pixels and at or above a preselected intensity value for white pixels, and, based on a comparison, one of replacing the first intensity value with a second intensity value and replacing the second intensity value with the first intensity value.

8. The method according to claim 6, wherein the threshold criteria includes:

whether the compared pixel value deviates from a median pixel value by more than a preselected percentage.

9. The method according to claim 7, wherein calculating the replacement pixel value includes:

replacing the compared pixel value with the median of the neighboring pixel values.

10. The method according to claim 7 further including:

passing penetrating radiation through a region of a subject to be imaged;

receiving the radiation with an array of radiation detectors which convert an intensity of received radiation into a corresponding electrical signal, at least one of the detectors malfunctioning at least intermittently such that the electrical signal from the malfunctioning detector fails to correspond to the intensity of received radiation; and, digitizing the electrical signals to generate the diagnostic data.

11. In a radiographic apparatus having a penetrating radiation source for projecting x-rays across an examination region, a plurality of radiation detector arrays disposed across the x-ray examination region from the penetrating source, the detector arrays including analog to digital converters for converting analog signals into digital signals, and an image calibration processor for calibrating and reconstructing the digital signals into pixel values of a digital image representation, an adaptive median filter for detecting and correcting defects in the digital image representation due to defective detectors in the radiation detector arrays, the adaptive median filter comprising:

a memory which stores each candidate pixel value and neighboring pixel values;

a processor which:

calculates a reference value from the neighboring pixel values, compares a relationship between the candidate pixel value and the reference value with an adaptive threshold criterion which is calculated by multiplying the reference value by a preselected percentage;

based on the comparison, one of (1) replacing the candidate pixel value with a function of the neighboring pixel values and (2) retaining the candidate pixel value.

12. The adaptive median filter according to claim 11, wherein the processor calculates a median value of the pixel value in a kernel corresponding to the candidate pixel value, at least one of the reference value and the function of neighboring pixel values being the median value.

13. The adaptive median filter according to claim 12, wherein the candidate pixel value is replaced with its corresponding median value if the candidate pixel deviates from the reference value by more than a preselected percentage.

14. The adaptive median filter according to claim 11, wherein the processor includes a field programmable gate array.

15. A method of radiographic diagnostic imaging including:

propagating x-rays through a subject;

detecting the x-rays which have propagated through the subject;

converting the detected x-rays into light signals;

converting the light signals into electrical signals;

generating an image representation;

scanning the image representation on a pixel by pixel basis using an n×n kernel;

calculating a median value of each kernel including:
reordering each kernel in numerical sequence,
merging adjacent pixels of like value into a merged pixel, and
after merging, selecting a numerical central pixel value as the median value;

calculating a deviation between the median value and the scanned pixel value;

comparing the deviation to a defect threshold; and based on the comparison, one of (1) replacing the scanned pixel value with the median value and (2) retaining the scanned pixel value.

16. The method according to claim 15, wherein the scanned pixel value is replaced by the median value when the scanned pixel value deviates from the median pixel value by more than a preselected percentage.

17. The method according to claim 15, wherein the unprocessed pixel value is retained for pixels where the difference value is less than the threshold value.

18. An adaptive filter for detecting and correcting digital image defects comprising:

a memory which stores each candidate pixel value and a kernel containing each candidate pixel value and a plurality of neighboring pixel values;

a processor which reorders the pixel values of each kernel, calculates a median value for the kernel, calculates a difference between the candidate pixel value and the median value, and compares the difference to a defect threshold which is calculated by multiplying the candidate pixel by a preselected percentage; and, based on the comparison, one of (1) replacing the candidate pixel value with the median value and (2) retaining the candidate pixel value.

* * * * *